US005542546A

United States Patent [19]

Gotte et al.

[11] Patent Number: 5,542,546
[45] Date of Patent: Aug. 6, 1996

[54] PROCESS AND APPARATUS FOR NON-AGITATED FLOTATION OF SUBSTANCES WITH A LOW DEGREE OF HYDROPHOBY AND/OR LOW STABILITY IN THE FOAM STRUCTURE, IN PARTICULAR OF SALT MIXTURES

[75] Inventors: Jost Gotte, Philippsthal; Harald Schnez, Petersberg; Arno Singewald, Kassel, all of Germany

[73] Assignee: Kali und Salz GmbH, Kassel, Germany

[21] Appl. No.: 434,765

[22] Filed: May 4, 1995

[30] Foreign Application Priority Data

May 7, 1994 [DE] Germany ............................ 44 16 261.8

[51] Int. Cl.⁶ .............................................. B03D 1/24
[52] U.S. Cl. ................................ 209/164.000; 209/170
[58] Field of Search .................................... 209/164, 168, 209/169, 170

[56] References Cited

U.S. PATENT DOCUMENTS 1,253,653  1/1918  Welsch .
1,310,051  7/1919  Blomfield .
3,298,519  1/1967  Hollingsworth .
3,730,341  5/1973  Mames .
4,490,248  12/1984 Filippov .
4,566,968  1/1986  Kivisto .
5,057,208  10/1991 Hagedorn .
5,282,538  2/1994  Moys .

FOREIGN PATENT DOCUMENTS 217854     6/1924   Germany .
3111506C2  10/1982  Germany .
3801905A1  8/1989   Germany .
92/9360    6/1992   WIPO .

OTHER PUBLICATIONS

A. Jungmann and U. A. Reilard, *Investigations into Pneumatic Flotation of Various Raw* . . . , Aufbereitungs–Technik —NR. Aug. 1988.

Primary Examiner—Thomas M. Lithgow
Attorney, Agent, or Firm—Collard & Roe, P.C.

[57] ABSTRACT

A process and apparatus for pneumatic flotation include thinning a conditioned and gassified pulp and then forming them in the separation chamber into an enclosed free jet.

13 Claims, 5 Drawing Sheets

PROCESS AND APPARATUS FOR NON-AGITATED FLOTATION OF SUBSTANCES WITH A LOW DEGREE OF HYDROPHOBY AND/OR LOW STABILITY IN THE FOAM STRUCTURE, IN PARTICULAR OF SALT MIXTURES

BACKGROUND OF THE INVENTION

1. Field of the Invention

The present invention relates to a process and a apparatus for non-agitated flotation of substances with a low degree of hydrophoby and/or low stability in the foam structure, in particular of salt mixtures, by gassifying of a conditioned pulp in the separation chamber with the aid of a gas injection device, from which the gassified pulp leaves in the form of a free jet.

2. The Prior Art

In such a known process for non-agitated flotation, which is known as pneumatic flotation, the conditioned pulp is pumped into a gassifying reactor under substantial pressure above atmospheric. In this case the gassing of the pulp is done by compressed air introduced from the outside. The gassified pulp leaves the gassifying reactor and enters the separation vessel and therein forms a free jet (article by A. Jungmann and U.A. Reilard concerning "Studies of the Pneumatic Flotation of Different Raw and Waste Substances with the Allflott System" ["Untersuchungen zur pneumatischen Flotation verschiedener Rohund Abfallstoffe mit dem Allflott-System"] published in "Aufbereitungstechnik" No. 8 (1988), p. 471.

The hydrophobic air-laden solid particles arrive on the surface of the separation vessel and form a foam, whereas the hydrophilic, non air-laden grains drop out of the free jet, or in part also out of the foam, sink and are drawn downwards as flotation residue.

In this process when the gassified pulp enters the separation vessel there is a correspondingly high flow speed which leads to turbulence in this area. This has the disadvantage, however, that a large portion of the grain bubble aggregates is destroyed by this turbulence, and therefore the grains can drop down, which entails corresponding losses in the flotation wastes.

To avoid this disadvantage, it has been proposed that the gassified pulp be introduced at high speed into an ascending pipe in which non-turbulent calming takes place and consequently a corresponding reduction in the flow energy occurs (see article by A. Jungmann and U.A. Reilard concerning "Studies of the Pneumatic Flotation of Different Raw and Waste Substances with the Allflott System" ["Untersuchungen zur pneumatischen Flotation verschiedener Rohund Abfallstoffe mit dem Allflott-System"] published in "Aufbereitungstechnik" No. 8 (1988), p. 473).

This system has the disadvantage, however, that in the area of the introduction of the free jet substantial turbulence builds up as a result of the pressure ratios prevailing there, which lead partly to backflow. This means, however, that the grain bubble aggregates do not arrive by the shortest route into the foam layer, which has the disadvantage that the air bubbles can be destroyed or separated and consequently the yield of useful flotation product is correspondingly smaller. (See also DE-OS 31 11 506, DE-PS 38 01 905).

SUMMARY OF THE INVENTION

It is an object of the present invention to provide a process and an apparatus by which pneumatic flotation takes place in a non-agitated gentle manner. In particular the grain bubble aggregates are conducted so that the route after leaving the gas injection device to the foam layer is as short as possible, as in this way the danger of the bubbles being separated by some event is reduced. This is particularly important since it is also to be taken into consideration that the maintenance of the bubble structure is time-dependent.

The above object is achieved according to the invention in that the gassified pulp is thinned with the aid of a thinner pulp or with a support liquid, and that this mixture is formed in the separation chamber into an enclosed vertical free jet. Additionally, the introduction of the thinner pulp or support liquid is done at the periphery of the free jet, preferably coaxially with respect to the free jet and from the beginning free jet.

Thinner pulp means: the ratio of solid to support liquid (more precisely support liquid+solid) is smaller.

By means of these measures the free jet provides a largely non-agitated calmed flow pattern, as turbulence and backflow are avoided due to the introduction of the thinner pulp or support liquid, and with this the grain bubble mixture reaches the foam layer by the shortest route. The addition of support liquid or thinner pulp is done coaxially with respect to the free jet, directly after the jet formation.

Collisions of the grain bubble aggregates with one another are also largely avoided by means of the free jet calmed in this manner. This has the result that here also, the danger of separation of air bubbles from the grain bubble aggregates is correspondingly reduced.

In order that the foam layer forming at the upper end of the free jet and the separation chamber is transported away as fast as possible, with the result that time-dependent foam disintegration is largely avoided, it is necessary that only a relatively thin foam layer forms, approximately 5–10 cm. This is achieved because the liquid level in the separation chamber is maintained adjacent to the upper edge of the separation chamber. An additional measure also produces the same results by having at the upper end of the free jet, the foam forming layer being supported by an air cushion.

The foam layer "slides" more easily over this air cushion into the corresponding foam drain channels and therefore contributes to reducing to a minimum the residue time of the grain bubble aggregates in the free jet, with the result that the danger of destruction of the bubble structure is correspondingly reduced.

Preferably the foam that has been formed is conducted away in a plurality of radially arranged foam drain channels.

The air cushion at the upper end of the free jet is formed most simply by having in the upper area of the separation chamber additional air being blown under the foam layer.

The process according to the invention particularly relates to the initial pneumatic flotation in systems in which saturated solutions serve as the support liquid, and in this case in particular the conversion of the salts of oceanic sediments. There has been success in separating valuable substances from surplus rock salt, with a good yield and purity. In addition the process can be controlled so that, for example, kieserite arrives in the foam. The flotative isolation of potassium chloride in the foam can be achieved with another conditioning medium. Again with different conditioning media, minerals such as schnönite, carnallite, langbeinite or rock salt can be conveyed into the foam structure.

The apparatus for performing the process of the invention is characterized in that at least one vertical upwardly open guide column is arranged in the separation chamber, which is provided on the bottom end with a gas injection device, wherein apertures are positioned above the gas injection device, by means of which the pulp or fresh support liquid is supplied for thinning the flotation mixture. In addition, the apertures through which the pulp or support liquid is supplied are coaxial with respect to the gas injection device.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
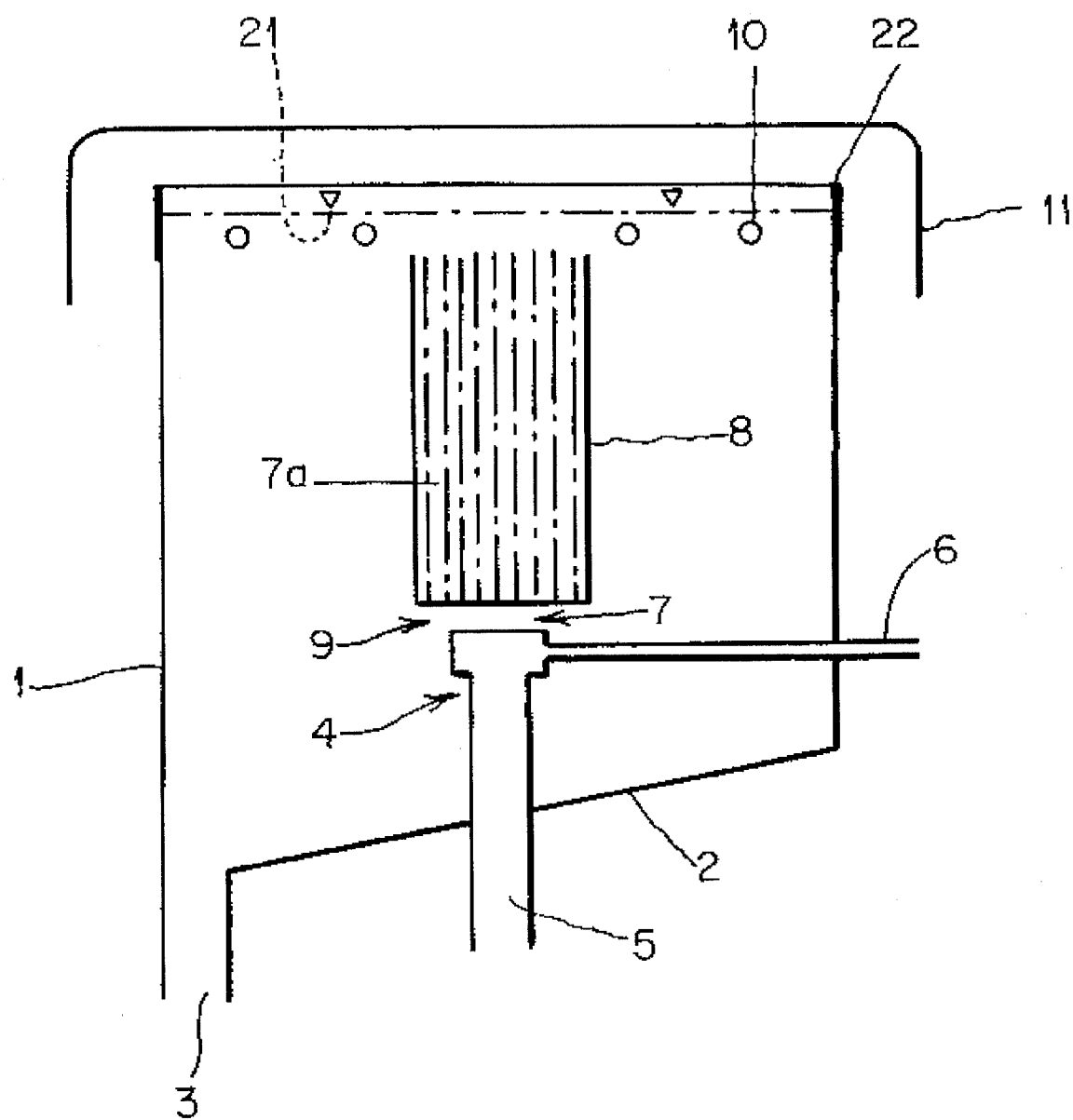
FIG. 1 shows the one embodiment of the apparatus of the invention.

Turning now in detail to the drawings, FIG. 1 shows the separation chamber 1 having the inclined base 2 which is provided with the drain aperture 3 by means of which the flotation residue is drawn off.

The freshly conditioned pulp is supplied by means of a supply pipe 5. The air is introduced into the pulp by means of the pneumatic air line 6. The gas injection device 4 into which the air line 6 opens out is arranged at the upper end of the supply pipe 5. At 7 the gassified pulp leaves this gas injection device 4 in the form of an enclosed free jet 7a. The enclosed free jet is formed by a guide column 8 which is essentially a pipe. When the free jet leaving the gas injection device is introduced into the guide column, then as a result of corresponding pressure ratios thinner pulp simultaneously enters at the aperture 9 from the separation chamber, coaxially with respect to the free jet 7a, and thins the free jet. This introduction of thinner pulp into the free jet, indeed from the beginning of the free jet, prevents turbulence which would otherwise occur in this area of the free jet after leaving the gas injection device, and calms the flow pattern of the free jet.

The pulp entering through the aperture 9 is thinner than the pulp introduced by the pipe 5, as in the separation chamber the thickness of the pulp is automatically reduced as a result of the separation processes. The thinning of the free jet by introducing thinner pulp or by support liquid results in a non-turbulent, non-agitated calmed flow. This also results in a dispersion of the mixture ascending in the free jet, with the result that collisions of solid particles laden with air bubbles are largely avoided and accordingly separation of the air bubbles, with the corresponding disadvantageous consequences for the yield are largely prevented.

By thinning the free jet the grain bubble aggregates in the free jet arrive by the shortest route at the foam layer, and the residence time of the grain bubble aggregates in the free jet is reduced to a minimum. This is important as the life of the air bubbles of such a grain bubble aggregate is also time-dependent.

As a result, it is necessary to ensure that such a grain bubble aggregate arrives as quickly as possible in the foam layer and from there goes into the foam drain channel.

It is also important that the foam layer being formed is transported away as quickly as possible. This is achieved in that a thinner foam layer is formed. This is done by keeping the liquid level 21 in the separation chamber adjacent to the upper edge 22 of the separation chamber.

An additional measure also produces the same results by having the foam layer being formed at the upper end of the free jet be supported by an air cushion. This is achieved because in the upper area of the separation chamber air is additionally injected in by means of air nozzles 10. The air cushion formed in this way ensures easier sliding of the foam layer into the surrounding foam drain channels 11.

The transporting away of the foam as quickly as possible also has repercussions for the residence time of the grain bubble aggregates, and reduces this time.

When the flotation mixture arrives at the upper end of the guide column, it is distributed in the separation chamber. The solid particles not made hydrophobic begin to drop down at once and collect in the drain channel 3, while the solid particles made hydrophobic collect in the foam layer.

Figure 2:
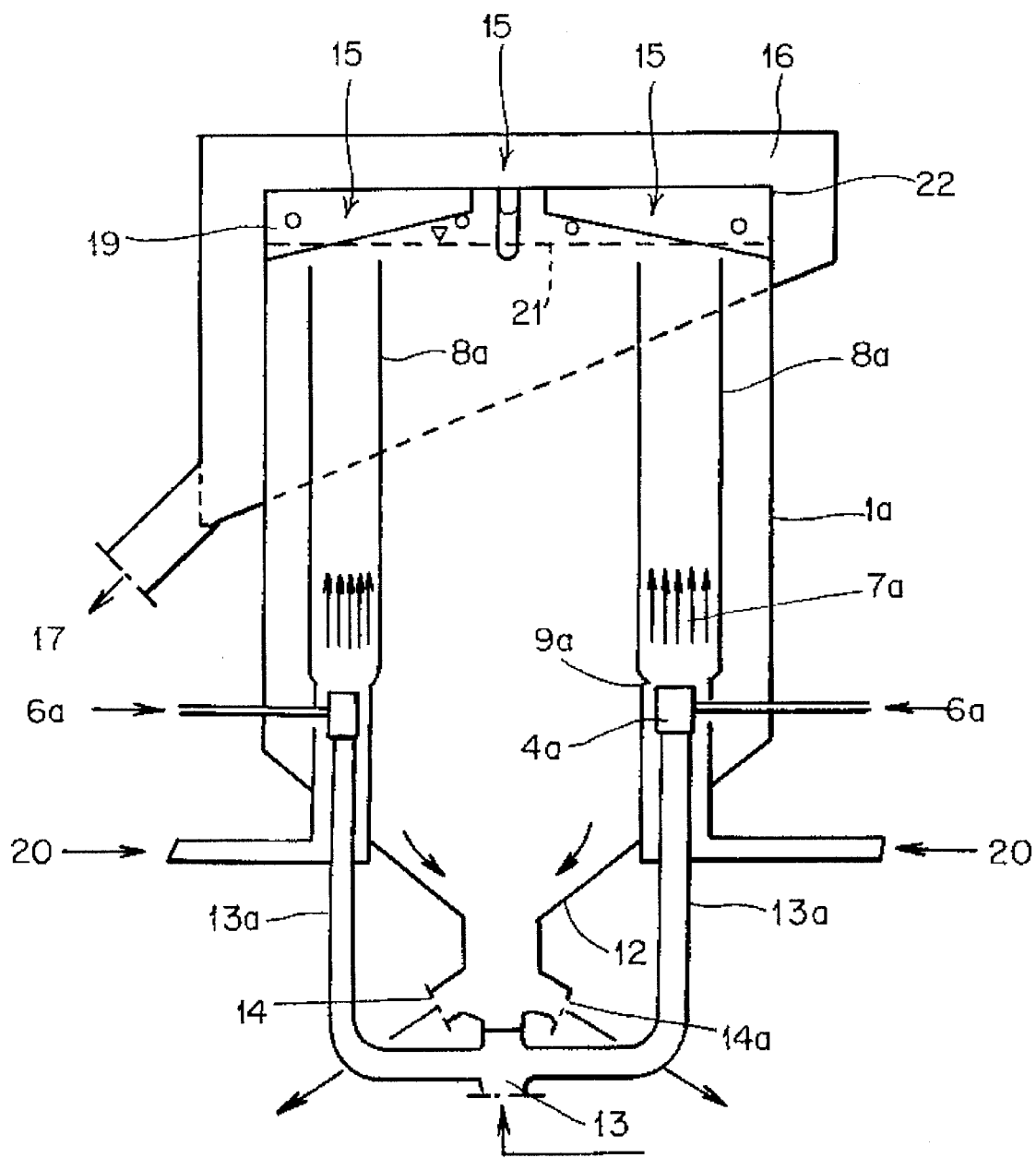
FIG. 2 shows a section view through a second embodiment of an apparatus for performing the process of the invention.

In FIG. 2, a second embodiment of the device of the invention is shown. Here, the separation chamber 1 is essentially a cylindrical vessel which becomes conical 12 in shape at the bottom.

The conditioned pulp is introduced by means of a supply pipe 13 and is distributed through the pipes 13a. Each pipe 13a is fitted into the lower portion of guide column 8a. The flotation residue is drawn off through pipes 14, 14a.

Figure 3:
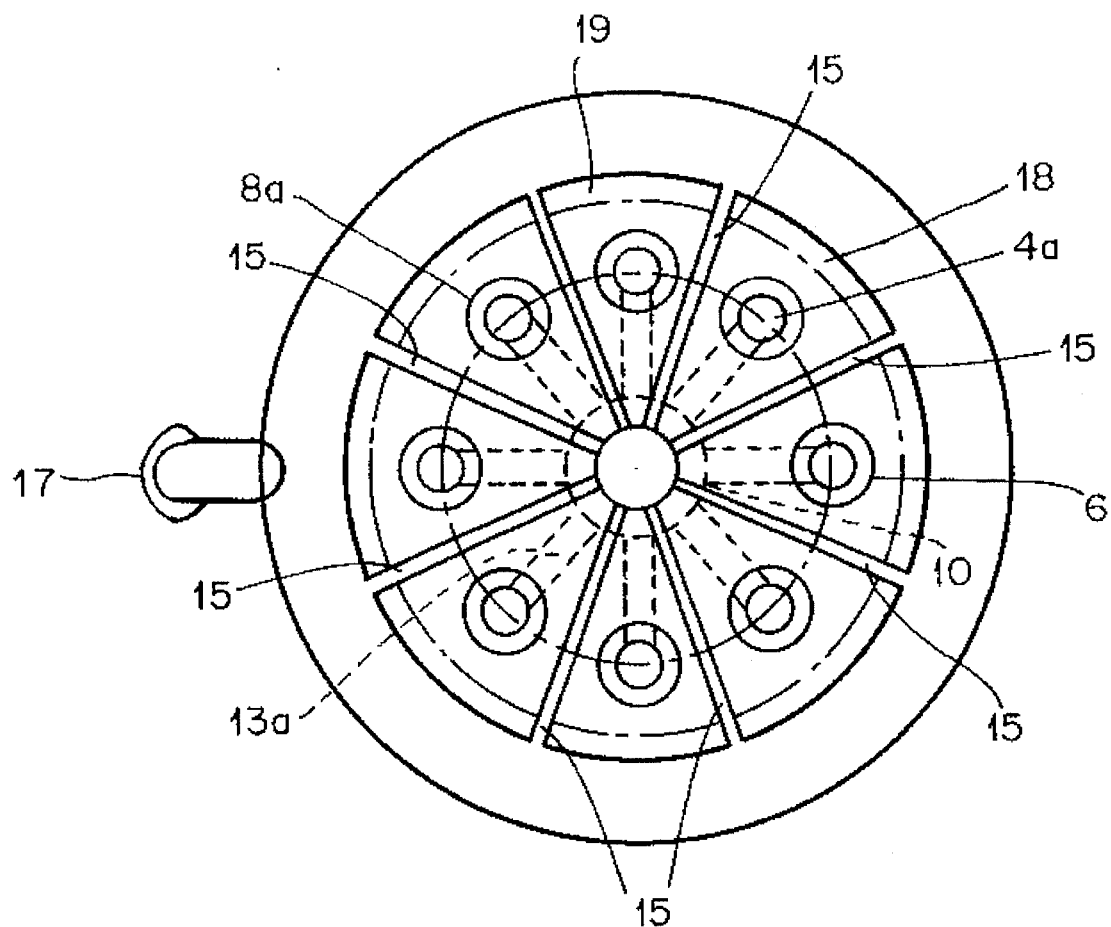
FIG. 3 shows a top view of the apparatus shown in FIG. 2.

A plurality of such guide columns 8a is arranged distributed around the periphery of the separation chamber, as shown in FIG. 3. The guide column 8a is upwardly open. Between the guide columns, in the area of the upper ends of the guide columns, radial foam drain channels 15 are arranged which open out into a common foam drain device 16 with the drain connection pipe 17. In the upper area of the separation chamber a porous closed pipe 18 is fitted, through the apertures 19 of which air can be blown in and injected under the foam layer being formed so that an air cushion forms which supports the foam layer. With this procedure, the removal of the foam layer is facilitated.

At the lower end of the guide column 8a, a gas injection device 4a is fitted. Fresh pulp through the pipe 13a and compressed air through the air line 6a are introduced into this gas injection device 4a. The compressed air is admixed with the pulp in the gas injection device 4a, as already described with reference to FIG. 1.

In the embodiment shown in FIG. 2, support liquid is additionally introduced coaxially with respect to the gas injection device and to the free jet through the pipe 20 and the aperture 9a formed adjacent to the gas injection device 4a, which then also arrives in the guide columns and thins the free jet, whereby the same results are achieved as already described with reference to FIG. 1.

Because of the coaxial introduction, the support liquid additionally surrounds in a ring-like manner the free jet produced by the gas injection device, whereby the energy dissipation of the free jet is also reduced.

Figure 4:
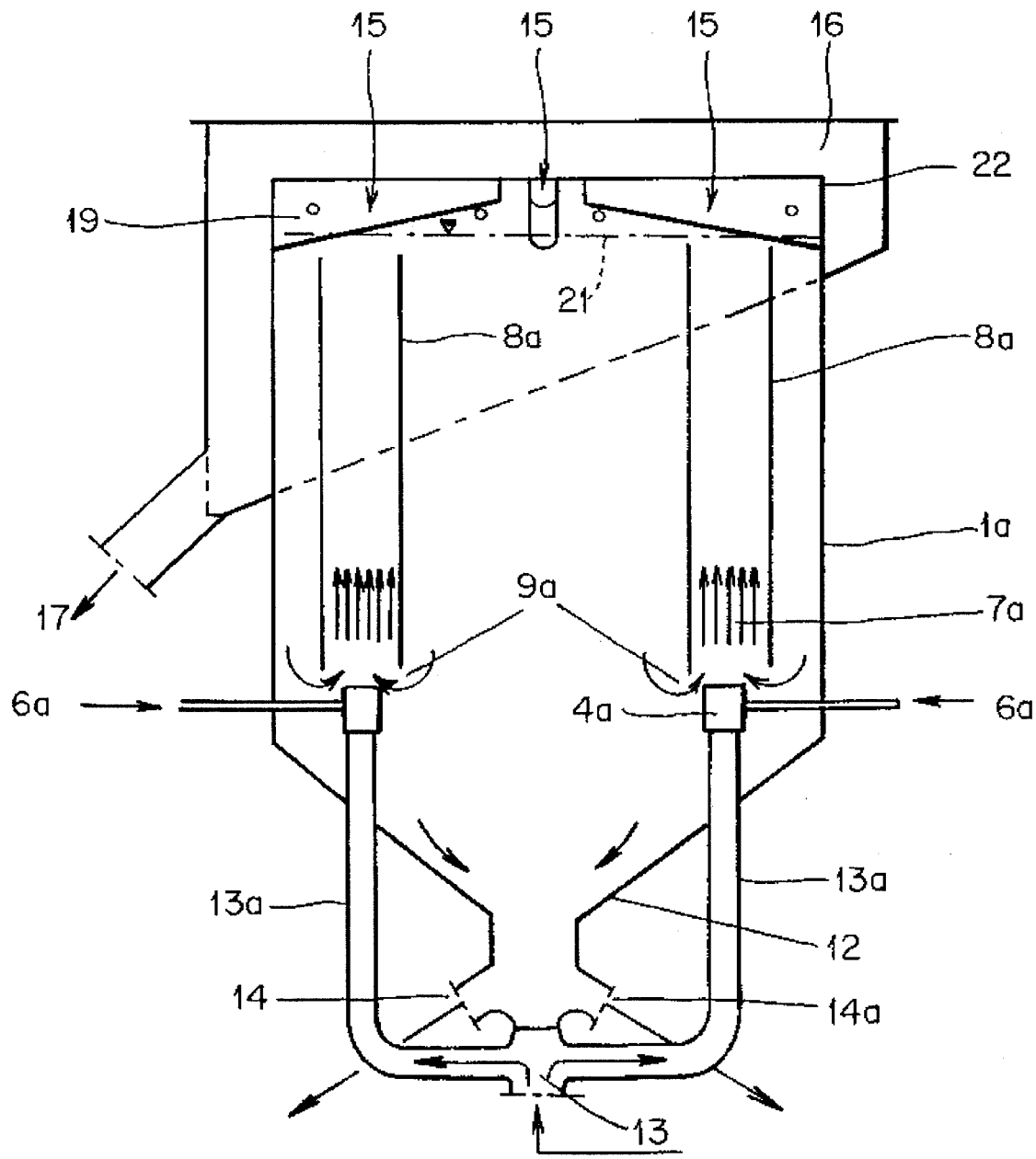
FIG. 4 shows a third embodiment of the apparatus of the invention.
Figure 5:
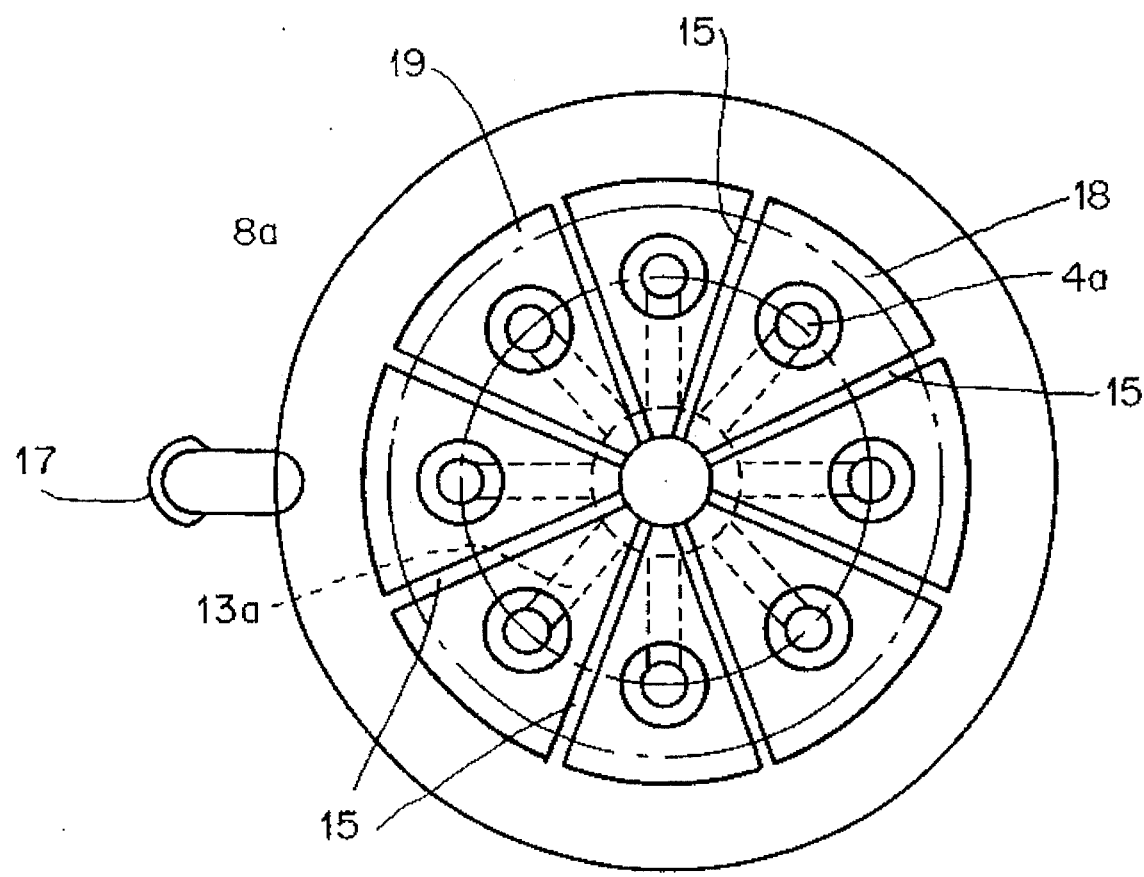
FIG. 5 shows a top view of the apparatus shown in FIG. 4.

FIGS. 4 and 5 show a third embodiment which differs from the embodiment shown in FIG. 2, in that no additional support liquid is introduced. Instead, the guide column 8a commences directly in the area of the gas injection device 4a. The lower end of the guide column 8a forms an aperture 9a in the form of an annular channel a spaced distance above device 4a and over which the thinner pulp flows after the free jet as a result of suction. This has already been described in detail with reference to the first embodiment shown in FIG. 1.

If the pulp which is introduced thorough the pipe 13 contains hard salt or raw potassium salt, then kieserite ($MgSO_4H_2O$) and respectively potassium chloride can be extracted with the foam, wherein in the first case for example praestabite oil is used as the conditioning medium, and in the latter case, for example, a fatty aminoacetate. In both cases, the mineral rock salt is extracted from the residue. A rock salt saturated solution serves as the flotation liquid. In the case of KC1 flotation, the flotation liquid is additionally saturated with KC1.

While several embodiments of the present invention have been shown and described, it is to be understood that many changes and modifications may be made thereunto without departing from the spirit and scope of the invention as defined in the appended claims.

What is claimed is:

1. Process for the agitatorless flotation of substances with a low degree of hydrophobing and/or low stability in a foam composite from substance mixtures, said substance mixture comprising a suspension of a plurality of salt components, said process comprises gassing a conditioned feed slurry of said suspension of a plurality of salt components with a gassing device, and separation of the gassed conditioned feed slurry into a foam product and a residue product, wherein the gassed conditioned feed slurry enters into a separation chamber in a vertical free jet, wherein at the beginning of the free jet, carrier liquid or slurry with a lower solids content than the feed slurry is coaxially admitted at the outer periphery of the vertical free jet of feed slurry to form a combined free jet of said feed slurry enveloped by said carrier liquid or additional slurry is formed.

2. Process according to claim 1, comprising
conducting the foam being formed into a plurality of foam drain channels arranged radially.

3. Process according to claim 1, comprising
subjecting salts from oceanic sediments to flotation.

4. Process according to claim 1, comprising
extracting kieserite ($MgSO_4H_2O$) with the foam.

5. Process according to claim 1, comprising
extracting potassium chloride with the foam.

6. Process according to claim 1, comprising
carrying out the flotation in a rock-salt saturated aqueous solution.

7. Process according to claim 1, further comprising
maintaining the liquid level in the separation chamber near the top edge of the separation chamber; and
supporting a forming foam layer of said foam product by an air cushion by injecting air underneath the foam layer above the liquid level.

8. Apparatus for the agitatorless flotation of substances with a low degree of hydrophobing and/or low stability in a foam composite from substance mixtures, in particular from suspensions of a plurality of salt components, comprising
a separation chamber having at least one vertical, upwardly open guide column arranged in said separation chamber, each guide column defining an axis and having a lower end;
a gassing device including means for feeding a free jet of gassed feed pulp into the separation chamber upwardly into a lower end of said at least one guide column, each gassing device being downwardly positioned in the axial direction so as to define a coaxial opening which is formed between the lower end of the guide column and the gassing device, said apparatus further comprises means for feeding additional slurry or a carrier liquid into the guide column via said opening.

9. Apparatus according to claim 8,
wherein the separation chamber has a circumference;
wherein several guide columns are arranged in the separation chamber distributed around the circumference; and
wherein associated gassing devices each axially feed into a pipe piece extending at a lower end of the guide column, in a way such that said means for feeding said carrier liquid is into an annular space between the gassing device and the extended pipe piece via a conduit connected thereto.

10. Apparatus according to claim 9, further comprising
foam discharge ducts positioned between the guide columns in an upper zone of the separation chamber, and said foam discharge ducts feeding into a common foam drain device.

11. Apparatus according to claim 8, further comprising
a porous ring conduit is positioned in an upper zone of the separation chamber; said porous ring conduit having openings which are directed into the separation chamber directly above the liquid level.

12. Process for non-agitated flotation of a mixture of salt components comprising the steps of:
injecting a gas into a conditioned feed pulp said mixture of salt components, in a separation chamber by means of a gas injection device to produce a gassified feed pulp;
thinning the gassified feed pulp by means of a thinner pulp or with a support liquid; said thinner pulp having a smaller solids content than said feed pulp, said thinning comprises introducing the thinner pulp or support liquid coaxially to the beginning of the free jet of feed pulp to form a mixture; and
forming said mixture into a combined enclosed vertical free jet thereby forming in said separation chamber a foam product and a residue product.

13. Process according to claim 12 comprising
forming a foam layer of said foam product; at an upper end of the separation chamber;
supporting said foam layer by an air cushion;
injecting addition air into the upper end of the separation chamber; and
maintaining the liquid level in the separation chamber adjacent an upper end of the separation chamber.

* * * * *